United States Patent
Bordellier et al.

(10) Patent No.: US 11,254,042 B2
(45) Date of Patent: Feb. 22, 2022

(54) THERMOFORMING ASSEMBLY

(71) Applicant: Centre Technique des Industries Mécaniques, Senlis (FR)

(72) Inventors: Franck Bordellier, Sainte-Luce-sur-Loire (FR); Clément Callens, Ligné (FR); Elise Dreano, Nantes (FR); Agnès Exertier, Nantes (FR)

(73) Assignee: CENTRE TECHNIQUE DES INDUSTRIES MECANIQUES

( * ) Notice: Subject to any disclaimer, the term of this patent is extended or adjusted under 35 U.S.C. 154(b) by 749 days.

(21) Appl. No.: 15/760,418

(22) PCT Filed: Oct. 7, 2016

(86) PCT No.: PCT/FR2016/052596
§ 371 (c)(1),
(2) Date: Mar. 15, 2018

(87) PCT Pub. No.: WO2017/060648
PCT Pub. Date: Apr. 13, 2017

(65) Prior Publication Data
US 2018/0257291 A1    Sep. 13, 2018

(30) Foreign Application Priority Data
Oct. 7, 2015   (FR) ...................................... 1559542

(51) Int. Cl.
*B29C 51/26*   (2006.01)
*B29C 51/30*   (2006.01)
(Continued)

(52) U.S. Cl.
CPC .......... *B29C 51/262* (2013.01); *B29C 51/087* (2013.01); *B29C 51/14* (2013.01);
(Continued)

(58) Field of Classification Search
CPC ..... B29C 51/262; B29C 51/30; B29C 51/087; B29C 51/14; B29C 51/261; B29K 2101/12; B29K 2105/08; B29K 2105/256
See application file for complete search history.

(56) References Cited

U.S. PATENT DOCUMENTS 4,946,551 A * 8/1990 Ishige ..................... B29C 31/08
156/222
5,759,594 A * 6/1998 Masui ................... B29C 51/145
425/510

FOREIGN PATENT DOCUMENTS

DE    27 18 933 A1    12/1977
EP    1 097 794 A1     5/2001
(Continued)

OTHER PUBLICATIONS

International Search Report dated Jan. 2, 2017 in corresponding PCT International Application No. PCT/FR2016/052596.
(Continued)

*Primary Examiner* — Robert J Grun
(74) *Attorney, Agent, or Firm* — Ostrolenk Faber LLP

(57) ABSTRACT

A thermoforming assembly includes a lower mold part (20) and an upper mold part (34). The two mold parts are able to move in a substantially vertical direction between an open position and a closed position. Retaining members (28) are able to hold a sheet of softened thermoplastic (10) in a substantially horizontal mean plane Pm between the two mold parts. The retaining members include a plurality of rods (28) mounted mobile in the lower mold part (20). The rods (28) project out from the lower mold part (20) when the two mold parts (20, 34) are in the open position, to hold the sheet of softened thermoplastic (10) in the substantially horizontal mean plane Pm and accompany it as the mold closes.

10 Claims, 1 Drawing Sheet

(51) Int. Cl.
*B29C 51/08* (2006.01)
*B29C 51/14* (2006.01)
*B29K 101/12* (2006.01)
*B29K 105/08* (2006.01)
*B29K 105/00* (2006.01)

(52) U.S. Cl.
CPC ............ *B29C 51/30* (2013.01); *B29C 51/261* (2013.01); *B29K 2101/12* (2013.01); *B29K 2105/08* (2013.01); *B29K 2105/256* (2013.01)

(56) References Cited

FOREIGN PATENT DOCUMENTS

| | | |
|---|---|---|
| EP | 2 813 339 A1 | 12/2014 |
| FR | 2 845 309 A1 | 4/2004 |
| JP | S61-258725 A | 11/1986 |

OTHER PUBLICATIONS

Written Opinion dated Jan. 2, 2017 in corresponding PCT International Application No. PCT/FR2016/052596.

* cited by examiner

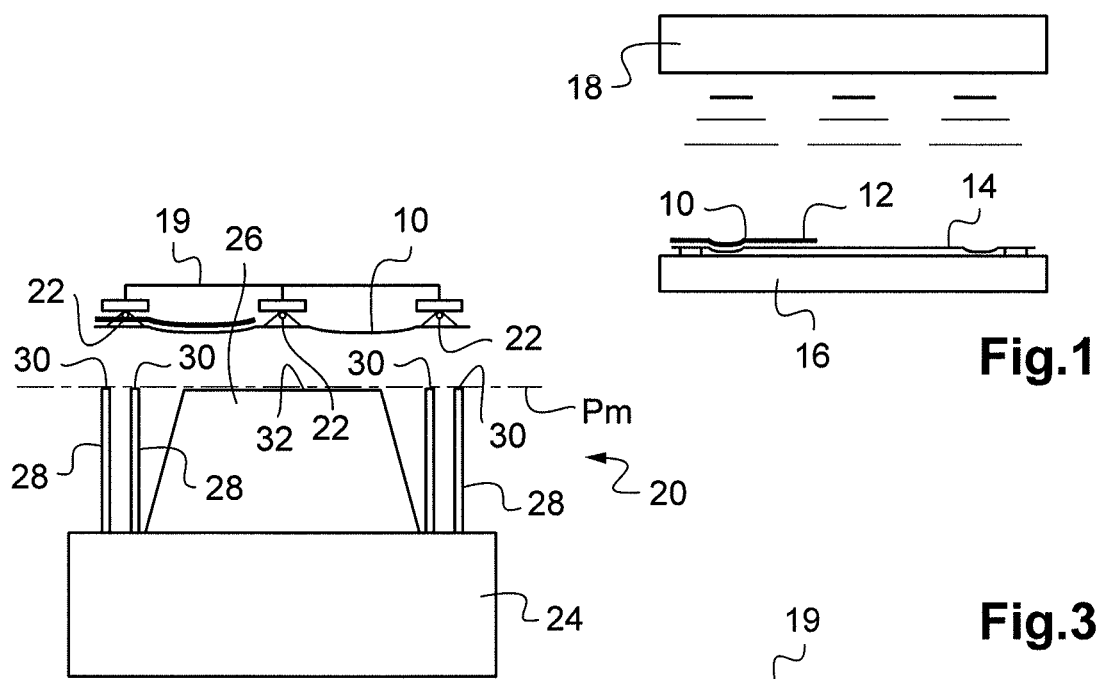
Fig.1
Fig.2
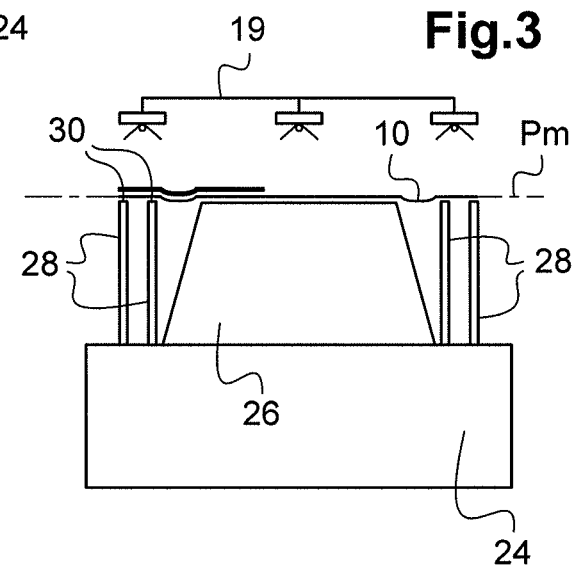
Fig.3
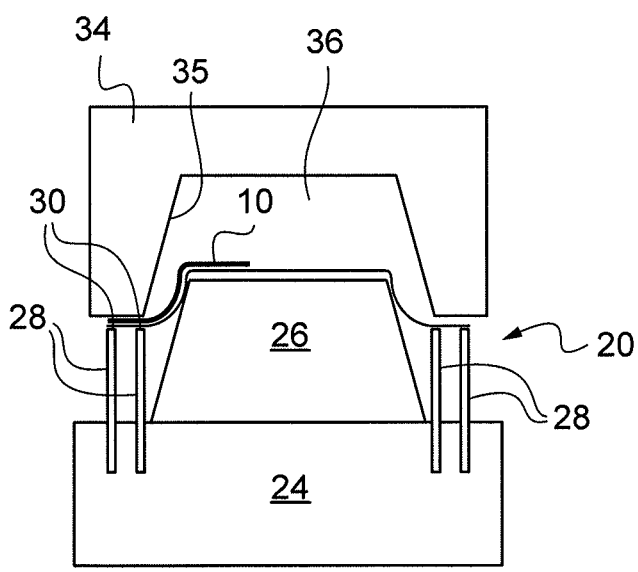
Fig.4
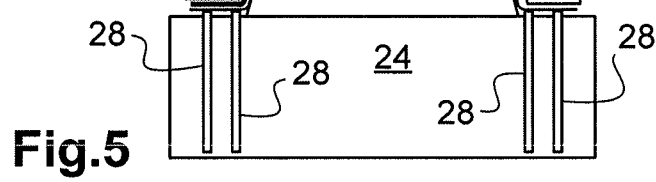
Fig.5

THERMOFORMING ASSEMBLY

CROSS-REFERENCE TO RELATED APPLICATIONS

The present application is a 35 U.S.C. §§ 371 national phase conversion of PCT/FR2016/052596, filed Oct. 7, 2016, which claims priority of French Patent Application No. 1559542, filed Oct. 7, 2015, the contents of which are incorporated by reference herein. The PCT International Application was published in the French language.

TECHNICAL FIELD

The present invention relates to a thermoforming assembly making it possible to shape sheet-form thermoplastics materials into relief in order to obtain three-dimensional components.

One predicted field of application is, in particular although not exclusively, that of the thermoforming of thermoplastics composite.

TECHNICAL BACKGROUND

Known thermoforming assemblies comprise two mold parts, a lower mold part usually comprising a punch of a shape that is predefined according to the component that is to be obtained, and an upper mold part in which is made an impression able to collaborate in a complementary manner with the punch. When the two mold parts are separated from one another, a sheet of thermoplastics composite in a softened state, which is referred to as a preform, and which is held by its edges, is extended substantially horizontally between the two mold parts. In order to do this, the sheet of thermoplastics composite is heated beforehand in an oven situated near the two mold parts. Next, the two mold parts are driven along a substantially vertical axis toward one another, while the sheet of softened thermoplastics composite becomes sandwiched between the two mold parts. The initially flat sheet of thermoplastics composite is then formed into a relief when the two mold parts are engaged one inside the other. After cooling, the two mold parts are separated from one another and the rigid component thus formed can be recovered.

The sheet of softened thermoplastics composite, or preform, is held by its edges using clamps or claws. This makes it necessary to provide a preform with a larger outline than the component that is to be produced from the preform, so as to form the edges. These edges are then cut off so that only the component of functional use is retained. As a result, for forming a given component, it is necessary to provide a not considerable excess of material in to order to form the edges.

SUMMARY OF THE INVENTION

So, one problem that arises and that the present invention seeks to address is that of providing a thermoforming assembly that makes it possible to obtain thermoformed components at a more attractive cost and requiring the use of less material.

With the objective of solving this problem, the invention proposes a thermoforming assembly for shaping sheet-form thermoplastics materials into relief. The assembly comprises a lower mold part and an upper mold part. The two mold parts are translationally mobile relative to one another in a substantially vertical direction between an open position, in which the two mold parts are separated from one another and a closed position, in which the two mold parts are engaged one inside the other.

The assembly further comprises holding members configured to hold a sheet of softened thermoplastics material in a substantially horizontal mean plane between the two mold parts. The holding members comprise a plurality of rods configured and mounted to have the ability to move in the mold lower part. The rods extend to project from the lower mold part, when the two mold parts are in the open position, to be able to hold the sheet of softened thermoplastics material in the substantially horizontal mean plane.

Thus, one feature of the invention comprises using a plurality of rods mounted in the lower mold part. When those rods extend as projections from the mold lower part, the projections can accept and support the sheet of softened thermoplastics material in a substantially horizontal mean plane. The rods are thereby able to support the sheet of softened thermoplastics material substantially lying flat above the tooling of the lower mold part which tooling is intended for forming. As a result, there is no need to provide an additional edge around the sheet of softened thermoplastics material for holding the additional edge during shaping of the preform by the mold parts. There is a saving of not to needing the material dedicated to providing such an edge. This is caused by the rods, which allow the preform to be supported from inside the mold. This makes it possible to create preforms having their entire surface be of functional use in the thermoformed component. The rods allow the preform to be held in a selected precise position and thus allow the preform to maintain its position as it deforms as the two mold parts engage one inside the other. Also, in order to achieve this, the rods of the plurality thereof are substantially uniformly spaced apart in the lower mold part. In that way, all the parts of the softened sheet of thermoplastics material extend in the aforementioned horizontal mean plane because the rods are actually close enough together, and the softened sheet of thermoplastics material is relatively rigid enough to prevent it from sagging excessively while supported on the rods. It will be seen that the sheet of softened thermoplastics material may exhibit parts extending on two different levels on each side of the horizontal mean plane and substantially parallel thereto.

Preferably, the mobile rods extend substantially vertically upward from the lower mold part. They are also able to move translationally along their own axes and, therefore, parallel to the vertical axis of the relative movement of the two mold parts. Also, the mobile rods retract, advantageously, when the two mold parts engage one inside the other. This withdrawal of the mobile rods is made easier if they extend parallel to the vertical axis of the relative movement of the mold parts.

According to one particularly advantageous embodiment of the invention, each mobile rod has a free end, and the free ends of the mobile rods define a reception mean plane when the mobile rods are extending as a projection from the lower mold part. Thus, the sheet of softened thermoplastics material precisely rests on the free ends of the mobile rods when they extend as a projection from the mold lower part. As a result, each free end forms a bearing point for the sheet, and the collection of bearing points defines the reception mean plane. This reception mean plane is substantially horizontal in the sense that the sheet of softened thermoplastics material can rest in equilibrium on the free ends of the mobile rods before the two mold parts are brought closer together. Thus, the reception mean plane may be substantially inclined with respect to the horizontal while the sheet remains in equilibrium. Also, certain parts of the sheet may sag appreciably, forming dips, or alternatively bumps, or may even be substantially inclined with respect to other parts of the sheet. The is reception mean plane defined by the rod free ends will nevertheless be qualified as substantially horizontal.

Another advantage, of a thermal nature, results from the use of the mobile rods. The rods make it possible to minimize dissipation of thermal energy from the sheet of softened thermoplastics material when the rods hold it on their free ends, because the total contact area between the rod ends and the sheet is small. As a result, compared with the prior art, it is possible to input less thermal energy into the sheet of thermoplastics material, while at the same time obtaining perfect forming the sheet.

As soon as the two mold parts engage one inside the other, sandwiching the softened preform, the rods retract into the mold lower part as the two mold parts move closer together and the upper mold part presses down on the rods.

According to one particularly advantageous embodiment of the invention, the free ends of the mobile rods are shaped to a point. The pointed free ends perfectly secure the softened preform to the free ends without risk of movement in the plane of the preform. In addition, the loss of heat energy from the preform is even lower, because the points of contact with the rods have even smaller surface areas, so the preform thus remains ductile at these points of contact.

According to one particularly advantageous feature of the invention, the lower mold part has a base and a male part extending as a projection from the base. The base has a wall, part of which constitutes the mold, and has a male part, or tool, and the plurality of rods essentially project from the base. The free ends of the rods are then able to extend at the same level or substantially above the extreme end of the male part. In that way, when the rods are extending as projections from the lower mold part, the preform can therefore extend flush with the male part.

Preferably, the free ends of the mobile rods define a reception mean plane extending above the male part. That holds the preform away from the male part which is colder, and so very little heat energy dissipates prior to forming.

The mobile rods also extend through the male part so that they can be uniformly spaced apart in a horizontal plane.

On the opposite side, the upper mold part has an impression and the male part is intended to extend into the impression when the two mold parts engage one inside the other. The male part and the impression are therefore dimensioned such that the space which may respectively separate their wall, when they are engaged one inside the other, corresponds substantially to the thickness of the preform. The preform may exhibit variations in thickness associated with a greater number of reinforcements in certain zones as a result, in these corresponding zones, the wall portions of the impression and of the male part are further away from one another.

Furthermore, the thermoforming assembly according to the invention comprises a heating device for heating the sheet of thermoplastics material, which heating device is situated near the two mold parts. In that way, the sheet of thermoplastics material is heated inside the heating device, to render it ductile, for example in an oven dedicated to that purpose, so that it can then be transferred onto the rods. The sheet of thermoplastics material is usually heated up to a temperature at least equal to the glass transition temperature of the thermoplastics polymer of which it is made.

Also, advantageously, the thermoforming assembly further comprises grippers enabling transfer of the sheet of softened thermoplastics material from the heating device toward the two mold parts. Use of these grippers is explained in the description which follows. These grippers advantageously comprise needles which can pick up the sheet of softened thermoplastics material from above.

BRIEF DESCRIPTION OF THE DRAWINGS

Other specifics and advantages of the invention will become apparent from reading the description given hereinafter of one particular embodiment of the invention, given by way of nonlimiting indication, with reference to the attached drawings in which:

FIG. 1 is a schematic view in a vertical plane, showing one element of the thermoforming assembly according to the invention;

FIG. 2 is a schematic view in a vertical plane, showing another element of the thermoforming assembly according to the invention, in a first phase of operation;

FIG. 3 is a schematic view of the other element depicted in FIG. 2, in a second phase of operation;

FIG. 4 is a schematic view of the other element depicted in FIG. 2, in a third phase of operation; and, FIG. 5 is a schematic view of the other element depicted in FIG. 2, in a fourth phase of operation.

DESCRIPTION OF AN EMBODIMENT

FIG. 1 illustrates a preform 10 comprised of sheets of thermoplastics composite material 12, 14 partially superposed and resting on a support 16 exposed to infrared radiation heating lines 18. The support 16 according to an embodiment not depicted comprises pads for supporting the preform 10, to reduce the dissipation by conduction of heat energy received by the preform 10. A thermoplastics composite material is a material, in this instance in sheet form. It comprises a polymer matrix made of a thermoplastic and reinforced by fibers extending inside the matrix. Preferably, the composite material in sheet form is comprised of a fiber reinforced polymer material with continuous fibers extending longitudinally in the core of the polymer material.

The preform 10 may be comprised of a single sheet of composite material or alternatively of a plurality of sheets of thermoplastics composite material which are superposed, partially or otherwise, in a predefined arrangement according to the nature of the component that is to be produced.

Any other type of heating that makes it possible to raise the temperature of the thermoplastics polymer of the composite material to a value substantially higher than its glass transition temperature, is suitable. The softened thermoplastics polymer becomes ductile. As a result, the preform becomes malleable.

After having been heated, the preform 10 is then grasped by a gripper 19 as depicted in FIG. 2, which fits the softened preform 10 over a thermoforming mold lower part 20. The gripper 19 comprises sets of needles 22 which are substantially inclined with respect to the mean plane of the gripper are coupled in opposite direction and are translationally mobile in opposite directions toward and away from the lower mold, so as to be able to engage through the preform and support it when the needles are in extension.

According to another implementation not shown, vacuum bells are able to form suction cups. They then grasp hold of the softened preform 10 from above.

The thermoforming mold lower part 20 has a base 24 surmounted by a male part 26 which forms a core or tool. In the Figure as depicted, the male part 26 is of frustoconical shape and its external wall therefore determines the internal shape of the component that is to be produced. This is quite obviously one example. Other, more complex, shapes of component can be produced using the thermoforming assembly according to the invention.

Furthermore, the mold lower part 20 has retractable rods 28 mounted vertically around the male part 26. Each of the retractable rods 28 has a free end 30 shaped to a point. However, according to other implementations, the rods may have a rounded, knurled or even flat ends. Also, the rods 28, of which four are depicted in the Figure, may be installed in greater number according to the component that is to be produced and the extent thereof.

In FIG. 2, the lower part 20 of the thermoforming mold is free in relation to an upper part that will be described hereinafter. Also, the retractable rods 28 extend as a projection from the lower part 20 and more specifically as a projection from the base 24 around the male part 26. As a result, the free ends 30 of the rods 28 define a reception mean plane Pm which lies flush with the top 32, which in this instance is flat, of the male part 26. The reception mean plane Pm is thus oriented substantially horizontally in consideration of tolerances resulting from use of rod ends and the shape of the top of the male part.

Also, the gripper 19 will set the softened preform 10 down accurately in a predefined position on the free ends 30 of the rods 28 and the top 32 of the male part 26. It then releases the preform, by actuating the sets of needles 22, as illustrated by FIG. 3. The gripper then moves vertically and thereafter laterally.

Also, in FIG. 3, the preform 10 rests substantially flat without any other contrivance, on the free ends 30 of the rods 28 and the top 32. In effect, the rods 28 are located close enough together that the bearing points constituted by the free ends 30 are able to support the preform lying flat. Given the ductile condition of the preform 10, some appreciable sagging may occur between two contiguous free ends 30. But, that should not compromise the thermoforming.

Preferably, efforts are made to ensure that the rods are long enough that the free ends 30 define a substantially horizontal mean plane Pm running tangential to the extreme end of the male part 26.

Furthermore, the pointed free ends 30 tend to penetrate appreciably into the preform 10, preventing unwanted movement of this preform in its own plane. Furthermore, due to the pointed free ends 30, the preform 10 offers a low area of contact with the ends 30 and, therefore, the preform suffers lower loss of heat energy. The thermoplastic polymer of which it is made is therefore still in the softened state and therefore ductile.

The rods 28 are located internally in the thermoforming mold and can thus contact and support the preform 10 from inside the mold.

Following from the step of laying down the preform 10 illustrated in FIG. 3, the gripper 19 is moved axially away and here vertically while the mold upper part 34 which is held in line with the lower part 20, is lowered. The mold upper part 34 has inside it a female part or impression 36 that complements the male part 26 and that will determine the contours of the external surface of the component that is to be produced by its internal wall 35. The complementary shapes between the female part 36 and the male part 26 are predefined according to an intended configuration of component to be molded.

As illustrated in FIG. 4, as the mold upper part 34 is lowered, and as the male part 26 of the mold penetrates inside the complementary female part 36, the rods 28 also retract vertically into the thickness of the base 24 and become retracted. The retraction of the rods 28 may result only from the lowering of the mold upper part 34 which comes into abutment against the free ends 30 of the rods, trapping the preform 10 between the two, wherein the rods 28 are mounted on elastic return means internal to the base 24, or alternatively this lowering is commanded, for example hydraulically. The latter embodiment is preferable so as not to damage the preform 10 locally.

Also, in parallel, the preform 10 lays itself down in a substantially vertical direction on the male part 26 and in this instance also on the flanks thereof. As a result, as the free ends 30 of the rods 28 release the still-ductile preform 10, the internal wall 35 of the female part 36 of the mold upper part 34 comes into contact with the preform 10, the latter also becoming pressed more fully against the male part 26. As a result, the fitting of the preform 10 between the two mold parts 20, 34 is perfectly controlled.

At the end of travel, as illustrated in FIG. 5, the mold upper part 34 is lowered to its lowest level while the preform 10 is sandwiched between the external wall of the male part 26 and the internal wall 35 of the female part 36, whereas the rods 28 are fully retracted into the thickness of the base 24 of the mold lower part 20.

The preform 10 is thus shaped into relief. Also, in this first phase depicted in FIG. 5, the two mold parts 20, 34 may then be cooled so that the temperature of the thermoplastics polymer can be brought back down below its glass transition temperature so that the preform regains its rigidity. As soon as the preform has regained rigidity, the mold upper part 34 is raised and the rigid component thus formed is removed.

Thus, by virtue of the rods 28 which allow the preform 10 to be supported flat before the two mold parts 20, 34 engage one inside the other and also allow it to be supported partially as the two mold parts are engaging with one another, is the preform 10 is held from the inside of the mold without need to hold it from the outside. As a result, there is no need to provide additional edges around the preform 10 in order to be able to hold it from the outside. A material saving is thus produced. Furthermore, there is no need to allow additional time in which to cut off this additional edge after thermoforming.

Thus, the method for implementing the thermoforming assembly according to the invention takes place in a succession of steps in which:

a lower mold part and an upper mold part are supplied;

a thermoplastics composite preform is supplied;

heat energy is supplied to the preform to soften it;

the softened preform is brought in over the mold lower part and the preform is supported at points and from underneath over the mold lower part;

the mold upper part is lowered to engage the two mold parts, one inside the other, while at the same time the preform ceases progressively to be supported at points.

In that way, due to the thermoforming assembly according to the invention and to the method of implementing it, thermoplastics composite components may be produced at advantageous cost.

The invention claimed is:

1. A thermoforming assembly for shaping sheet-form thermoplastics materials into relief, the assembly comprising:

a lower mold part and an upper mold part, the two mold parts being translationally mobile relative to one another in a vertical direction between an open position in which the two mold parts are separated from one another and a closed position in which the two mold parts are engaged, with one of the mold parts inside the other of the mold parts, the lower mold part having a base and a male part extending as a projection from the base, the male part having an extreme end; and a plurality of upstanding mobile rods having free ends to hold a sheet of softened thermoplastics material in a substantially horizontal mean plane Pm that is tangential to the extreme end of the male part of the base and is between the two mold parts when the two mold parts are in the open position;

wherein the plurality of upstanding mobile rods are mounted spaced apart in the base of the lower mold part and are movable vertically in the base of the lower mold part, the mobile rods extending to project from an upper surface of the lower mold part toward the upper mold part when the mold parts are in the open position to hold the sheet of softened thermoplastics material in the substantially horizontal mean plane Pm, wherein, in the open position, the free ends of the mobile rods are in a fully extended position to receive the sheet of softened thermoplastics material, wherein the free ends of the rods and the extreme end of the male part are coplanar when the rods are in the fully extended position to receive the workpiece, and wherein a path extends from the extreme end of the male part and the upper surface of the base of the lower mold part that accommodates the sheet of softened thermoplastic material without interruption when the lower mold part and the upper mold part are in a closed position.

2. The thermoforming assembly as claimed in claim 1, wherein the mobile rods extend substantially vertically from the lower mold part in a direction toward the upper mold part.

3. The thermoforming assembly as claimed in claim 1, wherein the mobile rods are configured and operable to retract into the lower mold part when the two mold parts engage one inside the other.

4. The thermoforming assembly as claimed in claim 1, wherein each free end extends toward the upper mold part, and the free ends of the mobile rods are located and operable to define the mean plane when the mobile rods are as projections from the lower mold part.

5. The thermoforming assembly as claimed in claim 1, wherein the free ends of the mobile rods are each shaped to a point.

6. The thermoforming assembly as claimed in claim 1, wherein the upper mold part has an impression and the male part is configured to extend into the impression when the two mold parts engage one inside the other.

7. The thermoforming assembly as claimed in claim 1, further comprising a heater for heating the sheet of thermoplastics material, and the heater is situated near the two mold parts.

8. The thermoforming assembly as claimed in claim 7, further comprising grippers disposed at the sheet and there configured to transfer the sheet of softened thermoplastics material from the heater toward the two mold parts.

9. The thermoforming assembly as claimed in claim 8, further comprising the grippers comprise needles configured to engage the sheet.

10. The thermoforming assembly as claimed in claim 1, wherein each mobile rod is an elongated body that terminates at the free end thereof, the free end being no wider than the body of the mobile rod.

* * * * *